United States Patent [19]

Liu et al.

[11] Patent Number: 4,634,737
[45] Date of Patent: Jan. 6, 1987

[54] COPOLYESTER-CARBONATE COMPOSITION

[75] Inventors: Ping Y. Liu, Naperville, Ill.; Edward L. Belfoure, New Harmony, Ind.

[73] Assignee: General Electric Company, Mt. Vernon, Ind.

[21] Appl. No.: 799,475

[22] Filed: Nov. 19, 1985

Related U.S. Application Data

[63] Continuation-in-part of Ser. No. 683,661, Dec. 19, 1984, abandoned.

[51] Int. Cl.$^4$ ............................................. C08L 69/00
[52] U.S. Cl. .................................. 525/146; 524/508; 525/147; 525/148
[58] Field of Search ............... 525/146, 147, 148, 439; 524/508

[56] References Cited

U.S. PATENT DOCUMENTS 4,476,274 10/1984 Liu ...................................... 525/147
4,481,331 11/1984 Liu ...................................... 525/146

FOREIGN PATENT DOCUMENTS 0111810 6/1984 European Pat. Off. .
3234174 3/1984 Fed. Rep. of Germany .

*Primary Examiner*—Theodore E. Pertilla
*Attorney, Agent, or Firm*—Myron B. Kapustij; Martin B. Barancik

[57] ABSTRACT

A glass free copolyester-carbonate composition exhibiting improved resistance to mild organic solvents comprising, in admixture:
(i) at least one high molecular weight thermoplastic aromatic copolyester-carbonate resin containing from about 25 to about 90 mole percent ester bonds;
(ii) at least one amorphous polyester resin containing the reaction products of
  (a) at least one polyol selected form 1,4-cyclohexanedimethanol or a mixture of 1,4-cyclohexanedimethanol and ethylene glycol, and
  (b) at least one aromatic dicarboxylic acid or its ester forming reactive derivative selected from isophthalic acid, terephathalic acid, or mixtures thereof; and
(iii) at least one polymer selected from
  (a) an olefin acrylate copolymer,
  (b) a polyolefin, and
  (c) an olefin diene terpolymer;

components (ii) and (iii) being present in amounts at least effective to impart to said composition a resistance to mild organic solvents greater than that possessed by said copolyester-carbonate resin.

30 Claims, No Drawings

COPOLYESTER-CARBONATE COMPOSITION

RELATED APPLICATIONS

This application is a continuation-in-part application of copending application Ser. No. 683,661 filed Dec. 19, 1984, now abandoned.

BACKGROUND OF THE INVENTION

Copolyester-carbonate resins are well known commercially available materials which, due to their many advantageous properties, are finding increasing use as thermoplastic engineering materials. Such copolyester-carbonates may be prepared by the reaction of a dihydric phenol, a carbonate precursor; and an ester precursor. The copolyester-carbonates exhibit high heat resistance, good dimensional stability, good tensile strengths, and good impact strengths. However, in certain applications the use of aromatic copolyester-carbonate resins is limited because they exhibit environmental stress crazing and cracking. "Environmental stress crazing and cracking" refers to the type of failure which is hastened by the presence of organic solvents such as, for example, the realtively weak organic solvents such as toluene, mineral spirits, and the like, when such solvents are in contact with stressed parts fabricated from aromatic copolyester-carbonate resins. The most significant effect is a loss of vital impact strength and also an increase in brittle type failure. Contact with such solvents may occur, for example, when parts are used in or around the windshields of automobiles, since most windshield washing solutions contain some of these weak organic solvents, or when these weak organic solvents are used to clean or degrease stressed parts made from copolyester-carbonate resins.

It is an object of the instant invention to provide copolyester-carbonate resin containing compositions exhibiting improved resistance to relatively weak organic solvents, particularly those solvents which are present in windshield washing solutions, as compared with copolyester-carbonate resins.

SUMMARY OF THE INVENTION

The instant invention is directed to copolyester-carbonate resin compositions exhibiting improved resistance to environmental stress crazing and cracking as compared with copolyester-carbonate resins. These copolyester-carbonate compositions consists essentially of, in physical admixture:
(i) at least one aromatic copolyester-carbonate resin;
(ii) an amorphous copolyester resin; and (iii) at least one polymer selected from
  (a) an olefin acrylate copolymer,
  (b) a polyolefin, and
  (c) an olefin diene terpolymer,
components (ii) and (iii) being present in amounts effective to improve the environmental stress crazing and cracking properties of the copolyester-carbonate.

DESCRIPTION OF THE INVENTION

In accordance with the instant invention there are provided glass free copolyester-carbonate resin compositions exhibiting improved resistance to environmental stress crazing and cracking, i.e., improved resistance to relatively mild organic solvents. These compositions comprise, in physical admixture:

(i) at least one high molecular weight thermoplastic aromatic copolyester-carbonate resin;
(ii) at least one amorphous copolyester copolymer resin; and
(iii) at least one polymer selected from
  (a) a copolymer of an olefin and at least one of a $C_1-C_6$ alkyl acrylate, a $C_1-C_6$ alkyl methacrylate, acrylic acid, methacrylic acid, or mixtures thereof,
  (b) a polyolefin, preferably a polyolefin copolymer, and
  (c) an olefin-rubbery diene terpolymer.

These compositions contain amounts of components (ii) and (iii) effective to positively upgrade the environmental stress crazing and cracking properties of the copolyester-carbonate resin.

Briefly stated the high molecular weight thermoplastic aromatic copolyester-carbonate resins comprise recurring carbonate groups, carboxylate groups, and aromatic carbocyclic groups in the polymer chain in which at least some of the carbonate groups and at least some of the carboxylate groups are bonded directly to ring carbon atoms of the aromatic carbocyclic groups.

These copolyester-carbonates contain ester bonds and carbonate bonds in the polymer chain, wherein the amount of ester bonds (ester content) is in the range of from about 25 to about 90 mole percent, preferably from about 35 to about 80 mole percent ester bonds (ester content). For example, 5 moles of bisphenol-A reacting completely with 4 moles of isophthaloyl dichloride and 1 mole of phosgene would give a copolyester-carbonate of 80 mole percent ester bonds (ester content).

The copolyester-carbonates of the instant invention, as well as methods for their preparation, are disclosed, inter alia, in U.S. Pat. Nos. 3,169,121, 4,238,596, 4,156,069 and 4,238,597, all of which are incorporated herein by reference.

The copolyester-carbonates may be prepared by a variety of processes including melt polymerization, transesterification, and the interfacial polymerization process.

These copolyester-carbonates may be readily prepared by the reaction of (i) at least one dihydric phenol, (ii) a carbonate precursor, and (iii) at least one ester precursor.

The dihydric phenols useful in the preparation of the instant copolyester-carbonates may be represented by the general formula

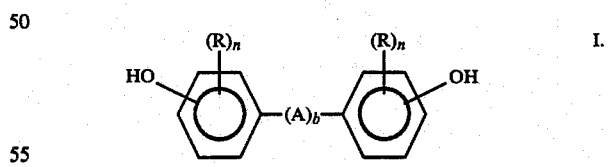

wherein:
R is independently selected from halogen and monovalent hydrocarbon radicals;
A is selected from divalent hydrocarbon radicals,

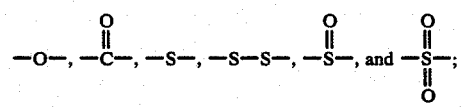

n is independently selected from integers having a value of from 0 to 4 inclusive; and b is either zero or one.

The monovalent hydrocarbon radicals represented by R include the alkyl, cycloalkyl, aryl, aralkyl, and alkaryl radicals. Preferred alkyl radicals are those containing from 1 to about 10 carbon atoms. Preferred cycloalkyl radicals are those containing from 4 to about 8 ring carbon atoms. Preferred aryl radicals are those containing from 6 to 12 ring carbon atoms, i.e., phenyl, naphthyl, and biphenyl. Preferred aralkyl and alkaryl radicals are those containing from 7 to about 14 carbon atoms.

The divalent hydrocarbon radicals represented by A include alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 4 to about 16 ring carbon atoms.

Some illustrative non-limiting examples of the dihydric phenols falling within the scope of Formula I include:
2,2-bis(4-hydroxyphenyl)propane (bisphenol-A);
1,1-bis(4-hydroxyphenyl)propane;
1,5-bis(4-hydroxyphenyl)pentane;
1,1-bis(4-hydroxyphenyl)decane;
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(3-methyl-5-chloro-4-hydroxyphenyl)cyclohexane;
1,3-bis(4-hydroxyphenyl)propane;
bis(4-hydroxyphenyl)ether;
p,p'-dihydroxydiphenyl;
4,4'-thiodiphenol; and
bis(3,5-diisopropyl-4-hydroxyphenyl)sulfone.

Other useful dihdyric phenols are disclosed in U.S. Pat. Nos. 3,169,121, 2,999,835, 3,027,365, 3,334,154, 3,035,021, 3,036,036, 3,036,037, 3,036,038, 3,036,039 and 4,111,910, all of which are hereby incorporated herein by reference.

It is, of course, possible to employ a mixture of two or more different dihydric phenols as well as individual dihdyric phenols in the preparation of the insatnt copolyester-carbonates.

The preferred dihydric phenols are the 4,4'-bisphenols.

The carbonate precursor may be a carbonyl halide, a carbonate ester, or a bishaloformate. The carbonyl halides which may be employed herein are carbonyl bromide, carbonyl chloride, and mixtures thereof. Typical carbonate esters which may be employed are diphenyl carbonate; di(halophenyl)carbonates such as di(chlorophenyl)carbonate, di(bromophenyl)carbonate; di(trichlorophenyl) carbonate, etc.; di(alkylphenyl)carbonates such as di(tolyl)carbonate, etc.; phenyl tolyl carbonate; chlorophenyl chloronaphthyl carbonate, etc., or mixtures thereof. The bishaloformates suitable for use herein include the bishaloformates of dihydric phenols such as the bischloroformate of hydroquinone, bischloroformate of bisphenol-A, and the like; or bishaloformates of glycols such as the bischloroformates of ethylene glycol, polyethylene glycol, neopentyl glycol, and the like. The preferred carbonate precursor is carbonyl chloride, also known as phosgene.

The ester precursor may be a difunctional carboxylic acid or, preferably, the ester forming reactive derivative of the difunctional carboxylic acid. In general, any difunctional carboxylic acid, preferably any ester forming reactive derivative thereof, conventionally used in the preparation of conventional linear polyesters may be utilized in the preparation of the instant copolyester carbonates. In general the difunctional carboxylic acids, and preferably their ester forming reactive derivatives, include the aliphatic difunctional carboxylic acids, the difunctional aromatic carboxylic acids, and the aliphaticaromatic carboxylic acids, and the ester forming reactive derivatives of these acids. Some useful difunctional carboxylic acids are disclosed in U.S. Pat. No. 3,191,121, which is hereby incorporated herein by reference.

Particularly useful difunctional carboxylic acids, preferably the ester forming reactive derivatives thereof, are the difunctional aromatic carboxylic acids.

The preferred ester forming reactive derivatives of the difunctional aromatic carboxylic acids are the acid dihalides, preferably the acid dichlorides. Some illustrative non-limiting examples of these derivatives are isophthaloyl dichloride, terephthaloyl dichloride, and mixtures thereof. A particularly useful mixture of the ester forming reactive derivatives of isophthalic acid and terephthalic acid is one which contains, in a weight ratio, from about 1:10 to about 9.8:0.2 of isophthaloyl dichloride to terephthaloyl dichloride.

Particularly useful copolyester-carbonates are those containing from about 70 to about 80 mole percent ester content, said ester content preferably being comprised of from about 1 to about 10 mole percent residues of terephthaloyl dichloride and from about 90 to about 99 mole percent residues of isophthaloyl dichloride. In these copolyester-carbonates the carbonate precursor is preferably phosgene and the dihydric phenol is preferably bisphenol-A.

A particularly useful method for preparing the copolyester-carbonate resins of the instant invention is the interfacial polymerization process utilizing an aqueous caustic solution, a water immiscible organic solvent such as methylene chloride, a catalyst, and a molecular weight regulator.

The catalyst which may be employed may be any of the well known catalysts which catalyze the copolyester-carbonate forming reaction. These catalysts include, but are not limited to tertiary amines such as triethylamine, tripropyl amine, N, N-dimethylamine, quaternary phosphonium compounds and quaternary ammonium compounds.

The molecular weight regulators are any of the known compounds that regulate the molecular weight of the copolyester-carbonate by a chain terminating mechanism These compounds include, but are not limited to, phenol, tertiarybutyl phenol, and chroman-I.

The instant copolyester-carbonate resins will have a weight average molecular weight in the range of from about 20,000 to about 200,000, preferably from about 25,000 to about 100,000.

Also included within the scope of the instant inevntion are the thermoplastic randomly branched high molecular weight aromatic copolyester-carbonates. These randomly branched copolyester-carbonates are derived from (i) a dihydric phenol, (ii) a carbonate precursor, (iii) an ester precursor, and (iv) a minor amount of a branching agent. The branching agents are well known compounds and are generally aromatic compounds containing at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phathalic anhydride, pyromellitic acid, pyromellitic dianhydride, mellitic acid, mellitic anhydride, trimesic acid, benzophenonetetracarboxylic acid, and the like.

Also included herein are blends of linear and branched copolyester-carbonates.

The amorphous copolyester copolymer resin for use as component (ii) herein is a polyester copolymer which can, without limitation, comprise the reaction products of: (a) a glycol portion comprising a 1,4-cyclohexanedimethanol with an acid portion comprising terephthalic acid, isophthalic acid, or mixtures thereof; or (b) a glycol portion comprising a 1,4-cyclohexanedimethanol and ethylene glycol wherein the molar ratio of the 1,4-cyclohexanedimethanol to ethylene glycol in the glycol portion is from about 4:1 to 1:4, with an acid portion comprising terephthalic acid, isophthalic acid, or mixtures thereof.

The copolyester component (ii) may be prepared by procedures well known in the art, such as by condensation reactions substantially as shown and described in U.S. Pat. No. 2,901,466 which is hereby incorporated herein by reference. More particularly, the acid or mixtures of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°–225° C. Thereafter the temperature is raised to about 250°–300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid compound is employed, an ester interchange type of catalyst is preferred, such as NaH Ti(OC$_4$H$_9$)$_6$ in n-butanol. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product can be cooled, pulverized, and the powder heated to a temperature somewhat less than employed during the last stage of molten polymerization thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing inert atmosphere at either normal atmospheric pressure or under greatly reduced pressure.

These copolyesters will generally have an intrinsic viscosity of at least about 0.4 dl./gm. as measured in 60/40 phenol/tetrachloroethane or other similar solvent at about 25° C. and will have a heat distortion temperature from about 60° C. to about 70° C. The relative amounts of the 1,4-cyclohexanedimethanol to ethylene glycol in the glycol portion of the copolyester (b) may vary so long as the molar ratio of 1,4-cyclohexanedimethanol to ethylene glcol is from 1:4 to 4:1, in order to provide a polyester copolymer having a suitable heat distortion temperature within the recited range, and other suitable properties.

One quite useful type of polyester for use as the amorphous polyester copolymer component (ii) is a copolyester as described hereinafore wherein the glycol portion has a predominance of ethylene glycol over 1,4-cyclohexanedimethanol, for example greater than 50/50 and especially preferably is about 70 molar ethylene glycol to 30 molar 1,4cyclohexanedimethanol, and the acid portion is terephthalic acid. A preferred polyester of this type is commercially available under the tradename KODAR PETG 6763 from Eastman Chemical Co. A preferred polyester is one derived from 1,4-cyclohexanedimethanol as the glycol portion and a mixture of isophthalic and terephthalic acids as the acid portion. This type of polyester is available from Eastman Chemical Co. under the tradename KODAR A150.

Component (iii) of the instant invention may be comprised of at least one olefin acrylate, at least one polyolefin, at least one olefin-rubbery diene terpolymer, or mixtures thereof. However, in one embodiment of the instant invention it is generally preferred that component (iii) contain only at least one olefin acrylate copolymer, or only at least one polyolefin, or only at least one olefinrubbery diene terpolymer. The olefin acrylate which may comprise component (iii) is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate, and the like; a $C_1$–$C_6$ alkyl methacrylate, e.g., methyl methacrylate, propyl methacrylate, hexyl methacrylate, and the like; acrylic acid; methacrylic acid; or mixtures thereof. Especially preferred are the well known copolymers of ethylene with an alkyl ester of acrylic acid. These are described in U.S. Pat. No. 2,953,551, which is hereby incorporated herein by reference. Generally, the acrylate or methacrylate portion of the copolymer can range from about 10 to about 30 weight percent. The olefin portion of the copolymer can range from about 70 to about 90 weight percent. The preferred copolymer for use as component (iii) is an ethylene ethyl acrylate, preferably one in which the weight ratio of the ethylene fraction is about 4.5 to 1. Suitable olefin acrylate copolymers, as defined hereinafore, can be prepared by methods well known in the art or can be obtained commercially, as for example Union Carbide's ethylene ethyl acrylate copolymer Bakelite DPD-6169.

Component (iii) of the instant invention may also be comprised of a polyolefin. The polyolefin may be a homopolymer or a copolymer. The polyolefins are compounds which are well known in the art. Preferred for use in this invention are polymers which have been derived from olefin monomers containing from 2 to about 10 carbon atoms. Some illustrative non-limiting examples of these polyolefins include polypropylene, polyethylene, polybutylene, polyisobutylene, and ethylene propylene copolymers.

Methods for the preparation of these polymers are abundantly described in the literature and known to those skilled in the art. The polyethylenes can be prepared by various procedures, using anionic, cationic or free-radical initiating catalysts, with conditions varied to produce a wide range of molecular weights and densities and various degrees of branching or non-branching for the polymer. In one procedure, which involves free-radical initiation, ethylene gas is polymerized in the presence of a peroxide initiating catalyst at a pressure between 1050 to 2820 kgf/cm$^2$ and a temperature between 100° and 200° C., to produce a relatively low density polymer, 0.90 to 0.94 gm./cm.$^3$.

The polyethylene can also be prepared by low pressure processes effective to attain a polymer of higher molecular weight and a higher density. In one such procedure, known as the Phillips process, ethylene is contacted in an inert solvent with a slurry of a catalyst, such as chromium oxide supported on a silica-alumina, at pressures of 28 to 35 kgf/cm$^2$ and temperatures of 130° to 170° C., followed by extraction of the polymer with hot solvent and purification, to produce polyethylene having a density between 0.96 to 0.79 gm./cm.$^3$.

Still other procedures are possible, such as emulsion polymerization in aqueous media in the presence of a peroxy compound, as well as suspension polymerization at low temperatures using a silver salt-peroxide redox system.

Also employable as component (iii) is polypropylene, a common commercial form of which is crystalline isotatic polypropylene. Such polymers can be prepared by anionically initiated reactions using a Ziegler type catalyst, e.g., titanium halide such as TiCl$_3$ in combination with an organometallic co-catalyst such as trialkyl aluminum halide. Polymerization generally proceeds rapidly at temperatures between 25° C. and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst or by free-radical initiation under high pressures.

Polymers based on still higher olefins are not as readily commercially available and, therefore, not as preferred. Examples of such higher polyolefins are polymers based on 2-methyl-1-butene, 1-pentene, 4-methyl-1-pentene, and isobutylene. They can be prepared by known procedures including those described in the Encyclopedia of Polymer Science and Technology, John Wiley & Sons, Inc., Vol. 9, pp. 440-460 (1965).

The linear low density polyolefins, such as for example linear low density polyethylene, may be prepared by state-of-the-art polymerization processes such as those described in U.S. Pat. No. 4,076,698, incorporated herein by reference. The polymer may have a density between 0.89 and 0.96 gm./cc.$^3$ and a controlled concentration of a simple side chain branching as opposed to random branching which distinguishes it from polymers such as high pressure low density polyethylene and high density polyethylene. The preferred range of density is 0.915 to 0.945 gm./cc.$^3$ The linear low density polymers are preferably made from ethylene and alpha olefins of three to 8 carbon atoms, e.g., butene-1, hexene-1 and octene-1 or mixtures thereof. The comonomer is used in minor amounts, e.g., 10 mole % or less of the total amount of monomers. A preferred range is about 1-3 mole %. A particularly useful copolymer is made from ethylene and butene-1 such as Escorene LPX-15 of Exxon.

In one embodiment of the instant invention it is preferred that when component (iii) is a polyolefin it be a polyolefin other than linear low density polyethylene.

The olefin-rubbery diene polymers which may also comprise component (iii) of the instant invention are well known in the art and are generally commercially available or may be readily prepared by known methods. They may be prepared by the reaction of an olefin with a diene. The olefins which may be reacted with the dienes are the known olefins as described hereinafore, preferably the lower olefins such as ethylene, propylene, butylene, and the like. The dienes include the well known dienes such as the norbornenes such as ethylidene norbornene, butadiene, pentadiene, isoprene, cyclopentadiene, cyclohexadiene, and the like. Preferred olefin-diene polymers are the terpolymers formed by the reaction of two olefins with a diene. Particularly useful terpolymers are those of the EPDM family such as ethylene propylene diene terpolymers. Some illustrative non-limtiing examples of the EPDM type terpolymers include ethylene propylene norbornene, ethylene propylene ethylidene norbornene, ethylene propylene butadiene, ethylene propylene pentadiene, ethylene propylene cyclopentadiene, and ethylene propylene cyclohexadiene. These EPDM type terpolymers are well known in the art and are generally commercially available, such as Epsyn 704 from Copolymer Rubber, and the Vistalon series from Exxon Chemicals such as Vistalon 3708, Vistalon 2504, and the like.

The amounts of components (ii) and (iii) present in the instant compositions are amounts which are effective to positively upgrade the environmental stress crazing and cracking properties, i.e., resistance to relatively weak organic solvents, of the instant compositions. Greater than these amounts of components (ii) and (iii) may be used so long as the properties desired for a particular application of these compositions are substantially maintained. That is to say, the amounts of components (ii) and (iii) present in the instant compositions are amounts which are effective to improve the resistance to mild organic solvents but insufficient to significantly deleteriously affect substantially most of the other advantageous properties of the copolyester-carbonate.

Generally a minimum of about 2 weight percent of component (ii) and a minimum of about 1 weight percent of component (iii) are sufficient to observe an improvement in the resistance to relatively weak organic solvents. A minimum of about 4 weight percent of component (ii) and a minimum of about 2 weight percent of component (iii) are preferred; while a minimum of about 5 weight percent of component (ii) and a minimum of about 3 weight percent of component (iii) are more preferred. A level of about 25 weight percent of component (ii) and about 20 weight percent of component (iii) should generally not be exceeded; preferably a level of about 20 weight percent of component (ii) and about 15 weight percent of component (iii); and more preferably a level of about 15 weight percent of component (ii) and about 10 weight percent of (iii).

Weight percent is measured as the amounts of components (ii) and (iii) in the total of components (i), (ii) and (iii).

The instant compositions thus generally contain from about 55 to about 97 weight percent of component (i), from about 2 to about 25 weight percent of component (ii), and from about 1 to about 20 weight percent of component (iii); preferably from about 65 to about 94 weight percent of component (i), from about 4 to about 20 weight percent of component (ii), and from about 2 to about 15 weight percent of component (iii); and more preferably from about 75 to about 92 weight percent of component (i), from about 5 to about 15 weight percent of component (ii), and from about 3 to about 10 weight percent of component (iii).

The compositions of the instant invention are free of glass such as glass fibers. The instant compositions also do not preferably contain any selectively hydrogenated linear, sequential, or radial teleblock copolymer resin of a vinyl aromatic compound and an olefinic elastomer such as that described in U.S. Pat. No. 3,333,024, to Haefele et al. The compositions of the instant invention also do not contain any added aromatic high molecular weight polycarbonate resin.

The compositions of the instant invention may optionally have admixed therewith the commonly known and used additives such as, for example, antioxidants; ultraviolet radiation absorbers such as the benzophenones, benzotriazoles, cyanoacrylates, and benzylidene malonates; hydrolytic stabilizers such as those disclosed in U.S. Pat. Nos. 3,489,716, 3,138,379 and 3,839,247, all of which are incorporated herein by reference; color stabilizers such as the organophosphites disclosed in U.S. Patent Nos. 3,305,520 and 4,118,370, both of which are incorporated herein by reference; and flame retardants.

Some particularly useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are hereby incorporated herein by reference. These flame retardants are present in the instant compositions in amounts effective to render the instant compositions flame retardant. In general these amounts range from about 0.01 to about 10 weight percent, based on the total of flame retardant and components (i)–(iii) present.

DESCRIPTION OF THE PREFERRED EMBODIMENTS

In order that those skilled in the art may better understand how the instant invention may be practiced, the following examples are set forth by way of illustration and not by way of limitation. In the examples all parts and percentages are on a weight basis unless otherwise specified.

The following example illustrates a composition falling outside the scope of the instant invention. It is presented for comparative purposes only.

EXAMPLE 1

A copolyester-carbonate resin derived from bisphenol-A, phosgene, and a mixture of isophthaloyl dichloride and terephthaloyl dichloride, containing 75 mole percent ester content, 93 mole percent of said ester being derived from isophthaloyl dichloride and 7 mole percent of said ester being derived from terephthaloyl dichloride, is fed to an extruder operating at a temperature of about 288° C. The extrudate is comminuted into pellets and the pellets are injection molded at about 300° C. to 340° C. into test specimens measuring 63.5 mm×12.7 mm×3.2 mm thick and 63.5 mm×12.7 mm×6.4 mm thick.

The following example illustrates a composition of the instant invention.

EXAMPLE 2

A composition containing 85 parts by weight of the copolyester-carbonate resin of Example 1, 10 parts by weight of an amorphous polyester (Eastman Chemical Co. KODAR A150), and 5 parts by weight of ethylene ethyl acrylate was prepared by blending the ingredients together in a laboratory tumbler. The resulting mixture was fed to an extruder operating at a temperature of about 288° C. The extrudate was comminuted into pellets and the pellets were injection molded at about 300° C. to about 340° C. into test specimens measuring 63.5 mm×12.7 mm×3.2 mm thick and 63.5 mm×12.7 mm×6.4 mm thick.

Some of the test specimens from Examples 1–2 were mounted on an ASTM stress jig (0.7% strain/170 kg$_f$/cm.$^2$) and soaked in a preheated (70° C.) windshield washing solution, General Motors' OPTIKLEEN, for two hours. These specimens were removed from the jig, the washing solution was allowed to evaporate at room temperature for 24 hours, and then subjected to the Notched Izod test, ASTM D256. The results of this test are set forth in Table I. Other specimens from Examples 1–2 were subjected to said Notched Izod test without having been soaked in said washing solution. The results of these tests are also set forth in Table I. Some of the unsoaked specimens were also tested to determine their Heat Distortion Temperature Under Load (DTUL) in accordance with ASTM D648. The results of these tests are likewise set forth in Table I.

In Table I the numerical superscripts indicate the percent of test specimens which were ductile in failure, no superscript indicating 100% ductility.

TABLE I

| Example No. | Before Soaking in Optikleen Notched Izod (kg$_f$cm./cm.) | | After Soaking in Optikleen Notched Izod (kg$_f$cm./cm.) | | DTUL (°C.) |
| --- | --- | --- | --- | --- | --- |
| | 3.2 mm | 6.4 mm | 3.2 mm | 6.4 mm | |
| 1 | 49.0$^0$ | 10.9$^0$ | broke | — | 163.5 |
| 2 | 33.8$^{40}$ | 31.0$^{40}$ | 33.8$^{40}$ | 31.0$^{40}$ | 147.4 |

As illustrated by the data in Table I the instant compositions (Example 2) exhibit improved resistance to mild organic solvents than does unmodified copolyester-carbonate resin (Example 1). It is clear from this data that it is the particular combination of components (ii) and (iii) that results in the instant compositions exhibiting this improvement in organic solvent resistance.

The foregoing detailed description has been given for clearness of understanding only and no unnecessary limitations are to be understood or implied therefrom. The invention is not limited to the exact details shown and described herein, for obvious modifications will occur to those skilled in the art.

What is claimed is:

1. A glass free copolyester carbonate composition exhibiting improved resistance to mild organic solvents consisting essentially of, in admixture:
(i) at least one high molecular weight thermoplastic aromatic copolyester-carbonate resin containing from about 25 to about 90 mole percent ester bonds;
(ii) at least one polyester resin containing the reaction products of
  (a) at least one polyol selected from 1,4-cyclohexanedimethanol or a mixture of 1,4-cyclohexanedimethanol and ethylene glycol, and
  (b) at least one aromatic dicarboxylic acid or its ester forming reactive derivative selected from isophthalic acid, terephthalic acid, or mixtures thereof; and
(iii) at least one polymer selected from
  (a) an olefin acrylate copolymer,
  (b) a polyolefin, and
  (c) an olefin diene terpolymer;
components (ii) and (iii) being present in amounts at least effective to impart to said composition a resistance to mild organic solvents greater than that possessed by said copolyester-carbonate resin.

2. The composition of claim 1 which contains from about 2 to about 25 weight percent of (ii) and from about 1 to about 20 weight percent of (iii).

3. The composition of claim 2 which contains from about 4 to about 20 weight percent of (ii) and from about 2 to about 15 weight percent of (iii).

4. The composition of claim 3 which contains from about 5 to about 15 weight percent of (ii) and from about 3 to about 10 weight percent of (iii).

5. The composition of claim 1 wherein (iii) is an olefin acrylate copolymer.

6. The composition of claim 5 wherein said olefin acrylate copolymer is a copolymer of an olefin and at least one of a $C_1$-$C_6$ alkyl acrylate, a $C_1$-$C_6$ alkyl methacrylate, acrylic acid, methacrylic acid, or mixtures thereof.

7. The composition of claim 6 wherein said olefin acrylate copolymer is a copolymer of an olefin and a $C_1$-$C_6$ acrylate.

8. The composition of claim 7 wherein said alkyl acrylate is ethyl acrylate.

9. The composition of claim 8 wherein said olefin is ethylene.

10. The composition of claim 1 wherein (iii) is a polyolefin.

11. The composition of claim 10 wherein said polyolefin is an olefin copolymer.

12. The composition of claim 11 wherein said olefin copolymer is ethylene propylene copolymer.

13. The composition of claim 1 wherein (iii) is an olefin diene terpolymer.

14. The composition of claim 13 wherein said olefin diene terpolymer is an ethylene propylene diene terpolymer.

15. The composition of claim 14 wherein said diene is selected from the norbornenes.

16. The composition of claim 15 wherein said diene is norbornene.

17. The composition of claim 15 wherein said diene is ethylidene norbornene.

18. The composition of claim 1 wherein said polyol of (ii) is a mixture of 1,4-cyclohexanedimethanol and ethylene glycol.

19. The composition of claim 18 wherein the molar ratio of 1,4-cyclohexanedimethanol to ethylene glycol is from about 4:1 to 1:4.

20. The composition of claim 19 wherein said acid or its ester forming reactive derivative is terephthalic acid.

21. The composition of claim 1 wherein said polyol of (ii) is 1,4-cyclohexanedimethanol.

22. The composition of claim 21 wherein said acid or its ester forming reactive derivative is a mixture of isophthalic acid and terephthalic acid.

23. The composition of claim 1 wherein said copolyester-carbonate resin of (i) is comprised of the reaction products of at least one dihydric phenol, a carbonate precursor, and at least one ester precursor.

24. The compsoition of claim 23 wherein said carbonate precursor is phosgene.

25. The composition of claim 24 wherein said ester precursor is selected from isophthaloyl dichloride, terephthaloyl dichloride, or mixtures thereof.

26. The composition of claim 25 wherein said dihydric phenol is bisphenol-A.

27. The composition of claim 26 wherein said copolyester-carbonate resin has an ester content of from about 70 to about 80 mole percent.

28. The composition of claim 27 wherein said ester content is comprised of from about 1 to about 10 mole percent terephthalic ester and from about 90 to about 99 mole percent isophthalic ester.

29. The composition of claim 1 which further contains a flame retardant amount of at least one flame retardant compound.

30. The composition of claim 29 wherein said flame retardant compound is selected from the alkali or alkaline earth metal salts of organic sulfonic acids.

* * * * *